(12) United States Patent
Walker et al.

(10) Patent No.: US 6,286,001 B1
(45) Date of Patent: Sep. 4, 2001

(54) SYSTEM AND METHOD FOR AUTHORIZING ACCESS TO DATA ON CONTENT SERVERS IN A DISTRIBUTED NETWORK

(75) Inventors: James D. Walker, Dallas; Alexander F. Webb, Arlington, both of TX (US)

(73) Assignee: DoodleBug Online, Inc., Dallas, TX (US)

( * ) Notice: Subject to any disclaimer, the term of this patent is extended or adjusted under 35 U.S.C. 154(b) by 0 days.

(21) Appl. No.: 09/256,872

(22) Filed: Feb. 24, 1999

(51) Int. Cl.[7] ................................................. G06F 17/30
(52) U.S. Cl. .............................................. 707/9; 709/225
(58) Field of Search .......................... 707/9, 10; 713/202; 709/203, 217, 218, 219, 223, 224, 225; 348/5.5

(56) References Cited

U.S. PATENT DOCUMENTS

| | | | |
|---|---|---|---|
| 5,706,507 | | 1/1998 | Schloss ................................ 395/615 |
| 5,708,780 | | 1/1998 | Levergood et al. ............. 395/200.12 |
| 5,821,927 | | 10/1998 | Gong ..................................... 345/335 |
| 5,832,212 | | 11/1998 | Cragun et al. ................... 395/188.01 |
| 5,835,722 | * | 11/1998 | Bradshaw et al. .................... 709/225 |
| 5,848,412 | * | 12/1998 | Rowland et al. ......................... 707/9 |
| 5,875,249 | * | 2/1999 | Mintzer et al. .......................... 380/54 |
| 5,878,233 | * | 3/1999 | Schloss ................................. 709/225 |
| 5,911,043 | * | 6/1999 | Duffy et al. ........................... 709/203 |
| 5,987,606 | * | 11/1999 | Cirasole et al. ...................... 713/200 |
| 5,996,011 | * | 11/1999 | Humes .................................. 709/225 |
| 6,012,087 | * | 1/2000 | Freivald et al. ...................... 709/218 |
| 6,037,934 | * | 3/2000 | Himmel et al. ....................... 345/332 |
| 6,041,355 | * | 3/2000 | Toga ..................................... 709/227 |
| 6,041,360 | * | 3/2000 | Himmel et al. ....................... 709/245 |
| 6,052,785 | * | 4/2000 | Lin et al. .............................. 713/201 |

\* cited by examiner

*Primary Examiner*—Thomas Black
*Assistant Examiner*—Uyen Le

(57) ABSTRACT

A browser capable of accessing only web pages previously authorized by a parent or supervisor of a user of the browser. In a supervisor mode of operation, a parent can browse through any accessible web site and continually add approved web sites to a database of authorized web sites. Later, in a user mode of operation, the child is capable of accessing only those web sites that have been added to the authorized web site database. In the supervisor mode of operation, the browser also generates pixel signatures based on image data contained in web pages of the authorized web sites and generates checksum values based on text data contained in web pages of the authorized web sites. The browser later compares pixel signatures and checksum values from subsequently accessed web pages to the original pixel signatures and checksum values to determine if any of the data in the authorized web pages has been changed.

21 Claims, 7 Drawing Sheets

SYSTEM AND METHOD FOR AUTHORIZING ACCESS TO DATA ON CONTENT SERVERS IN A DISTRIBUTED NETWORK

TECHNICAL FIELD OF THE INVENTION

The present invention is directed, in general, to an application for viewing selected content on a wide area network accessible to the general public and, more specifically, to a client/server browser system for preventing children from accessing inappropriate web sites on the Internet.

BACKGROUND OF THE INVENTION

The Internet is a wide area network that links together many thousands of smaller sub-networks. These sub-networks are owned by different businesses, government entities, universities, and other organizations. The information, or content, on these sub-networks is accessible to outside parties by means of the World Wide Web (or "W3" or "Web"). The Web comprises software, standardized protocols, and other widely-accepted conventions that enable a computer user (or client) to browse (or navigate) through the vast amounts of data content distributed among the host computer(s) (or server(s)) in each of the sub-networks.

The content on the Web is organized into web sites. Each web site is a collection of text data files, graphical data files, and multimedia (e.g., audio/video) data files belonging to, and controlled by, a single business, governmental body, university, non-profit organization, etc. A web site comprises one or more web pages that contain the text, graphics and multimedia content that a computer user reads, views, and/or hears. The primary web page of each web site is referred to as a "home page" and each web page is identified by a Uniform Resource Locator (or "URL"). A URL is the electronic equivalent of an Internet address.

There are a number of browser applications available that enable a computer user to browse (or "surf") the Web. These browsers may run on a variety of computer platforms. However, the most popular platforms are personal computers (PCs) that use WINDOWS™ or MACINTOSH™ operating systems. Two of the better-known browser applications are NETSCAPE™ and MICROSOFT INTERNET EXPLORER™. Browser applications use simple mouse and keyboard controls to make it easy to locate and to move between web sites and to view and to download content stored at web sites. A PC user may access a web site by typing the URL of the web site into a special window on the browser screen. A PC user also may jump from a first web site to a second web site by selecting (or "clicking") a link on a web page in the first web site. The link automatically accesses the URL of the second web site without requiring the user to type the URL into a dedicated window. A user also may access web sites by means of searching software (or "search engine") that locates web sites that match search criteria selected by the user.

The features of the Web and the advanced capabilities of browsers combine to make surfing the Web a relatively user friendly experience. As a result, there has been an explosion in the number of persons that access the Web. There has been a correspondingly large increase in the number and variety of web sites on the Internet.

While ease of use and variety of content are two of the primary attractions of the World Wide Web, these advantages also are accompanied by drawbacks. Since Web sites are separately owned and controlled by independent entities, the content that may be readily accessed from each web site is determined almost entirely by the owner of the web site. Many web sites contain content that many people find offensive, including text and images that may be obscene, pornographic, racist, graphically violent, or the like. A PC user may inadvertently access offensive material by carelessly selecting a URL link for an unfamiliar web site while browsing on another, inoffensive web site. The PC user may also accidently access an offensive web site that is found by a search engine.

This problem is even more acute when the PC user is a child. Many parents are unwilling to allow their children to browse the Web without supervision because of the unknown content of many web sites. But the problem is by no means limited to children. Many businesses attempt to limit access to web sites that may be deemed offensive to employees and/or customers. One goal of employer restrictions is to prevent sexual harassment lawsuits based in whole or in part on claims of a hostile work environment caused by one or more employees browsing through pornographic web sites in full view of other offended employees. Another goal of these restrictions is to prevent employees from wasting valuable work time browsing on non-work related web sites, whether or not the non-work related web sites contain offensive materials. Other organizations, such as public libraries, also attempt to limit access to offensive web sites for a variety of reasons.

A number of solutions have been offered to filter (i.e., censor) offensive web sites. Filtering software products, such as SurfWatch, Cyberpatrol, Cybersitter, and NetNanny, use one or more techniques to prevent a child from accessing offensive materials. Some filters look for key words on a targeted web site, such as "sex," "nude," "porn," "erotica," "death," "dead," "bloody," "cocaine," "crack," "drug(s)," and the like, and block access to the web site. Unfortunately, these filters frequently block access to inoffensive web sites in which a key word is used in a harmless manner (e.g., "Don't use drugs") or is embedded in an otherwise innocuous word (e.g., "Essex" or "Animal Crackers").

Some filters include a database of forbidden web sites that operates in conjunction with a browser. The filter prevents the browser from accessing any site found in the database. The filter usually can be updated on-line to stay current with offensive data bases. Unfortunately, it is exceedingly difficult, if not impossible, to create and to maintain a comprehensive data base of offensive sites, especially when many web sites frequently and deliberately change their URLs in order to avoid being blocked by the filtering software. Additionally, filtering software places the decision regarding which web sites are inappropriate for a child in the hands of someone other than the child's parents. What may be inoffensive to the designer of the filtering software may still be offensive to some parents, and vice versa.

There is therefore a need in the art for improved systems and methods for allowing a child to browse the World Wide Web or a similar WAN network without supervision. In particular, there is a need for a browser system that gives a parent complete control in selecting the web sites and individual web pages that the child may access. More particularly, there is a need for a browser system that prevents a child from accessing any web site that the parent has not approved. There is a still further need for an improved browser system that places the parental or supervisory controls directly in the desktop home personal computer.

SUMMARY OF THE INVENTION

To address the above-discussed deficiencies of the prior art, it is a primary object of the present invention to provide a browser capable of accessing only web pages previously authorized by a parent or supervisor of a user of the browser. In an advantageous embodiment of the present invention, the browser may optionally include a "start up" database of approved web sites and web pages. The parent or supervisor then may modify the start up database by adding or deleting new web pages or web sites. In a supervisor mode of operation, a parent can browse through any accessible web site and continually add approved web sites to a database of authorized web sites. Later, in a user mode of operation, the child is capable of accessing only those web sites that have been added to the authorized web site database. In the supervisor mode of operation, the browser also generates pixel signatures based on image data contained in web pages of the authorized web sites and generates checksum values based on text data contained in web pages of the authorized web sites. The browser later compares pixel signatures and checksum values from subsequently accessed web pages to the original pixel signatures and checksum values to determine if any of the data in the authorized web pages has been changed.

Accordingly, in one embodiment of the present invention, there is provided a browser apparatus for accessing web page data stored on a plurality of servers in a distributed data network, the browser apparatus comprising: 1) a data processor capable of retrieving the web page data from the plurality of servers; and 2) a memory associated with the data processor capable of storing a database of authorized web sites associated with the web page data, wherein the data processor operates in a supervisory mode in which an operator of the browser apparatus selects the authorized web sites to be included in the database, and wherein the data processor operates in a user mode in which a user of the browser apparatus may access the web page data only from the authorized web sites in the database.

According to one embodiment of the present invention, the data processor stores addresses of the authorized web sites in the database.

According to another embodiment of the present invention, the data processor in the user mode compares an address of a web site selected by the user with at least one of the addresses stored in the database.

According to still another embodiment of the present invention, the web page data comprises at least one of text data and image data and wherein the data processor in the supervisory mode generates from the at least one of text data and image data associated with a first selected web page data first modification indicia capable of being used by the data processor to detect a modification of the at least one of text data and image data associated with the first selected web page data when the first selected web page data is subsequently accessed in the user mode.

According to a further embodiment of the present invention, the first modification indicia is stored in the database.

According to a still further embodiment of the present invention, the data processor, during a subsequent access of the first selected web page data in the user mode generates from the at least one of text data and image data associated with the first selected web page data second modification indicia and detects the modification by comparing the second modification indicia with the first modification indicia.

According to a yet further embodiment of the present invention, the first modification indicia comprises a pixel signature generated from pixel information associated with selected image data associated with the first selected web page data.

According to another embodiment of the present invention, the first modification indicia comprises a checksum value generated from selected text data associated with the first selected web page data.

According to still another embodiment of the present invention, the data processor modifies at least one button function of a mouse device associated with the browser apparatus to prevent the user from accessing web page data not associated with an authorized web site stored in the database.

According to a further embodiment of the present invention, the data processor modifies at least one button function of a keyboard device associated with the browser apparatus to prevent the user from accessing web page data not associated with an authorized web site stored in the database.

The present invention also discloses a unique method of browsing the Internet. In an advantageous embodiment of the present invention, there is provided, for use in a distributed data network comprising a plurality of servers capable of storing web page data in a plurality of web sites on the plurality of servers, a method of browsing web page data. The claimed method comprises the steps of 1) in a supervisory mode, selecting authorized web sites to be included in a database; 2) storing addresses of the selected authorized web sites in the database; and 3) in a user mode, accessing web page data only from the authorized web sites in the database.

In one embodiment of the present invention, the method comprises the further step of comparing an address of a web site selected by the user with at least one of the addresses stored in the database.

In another embodiment of the present invention, the web page data comprises at least one of text data and image data and including the further step, in the supervisory mode, of generating from the at least one of text data and image data associated with a first selected web page data first modification indicia capable of detecting a modification of the at least one of text data and image data associated with the first selected web page data when the first selected web page data is subsequently accessed in the user mode.

In another embodiment of the present invention, the first modification indicia is stored in the database.

In still another embodiment of the present invention, the method comprises the further step, during a subsequent access of the first selected web page data in the user mode, of generating from the at least one of text data and image data associated with the first selected web page data second modification indicia.

In yet another embodiment of the present invention, the method comprises the further step of detecting the modification by comparing the second modification indicia with the first modification indicia.

In another embodiment of the present invention, the first modification indicia comprises a pixel signature generated from pixel information associated with selected image data associated with the first selected web page data.

In a further embodiment of the present invention, the first modification indicia comprises a checksum value generated from selected text data associated with the first selected web page data.

In a still further embodiment of the present invention, the method comprises the further step of modifying at least one button function of a mouse device associated with a computer system performing the method to prevent the user from accessing web page data not associated with an authorized web site stored in the database.

In a yet further embodiment of the present invention, the method comprises the further step of modifying at least one button function of a keyboard device associated with a computer system performing the method to prevent the user from accessing web page data not associated with an authorized web site stored in the database.

The present invention may also be embodied as a program stored on a storage media, such as a computer floppy disk, a CD ROM, a reel tape, etc. The program may then be downloaded onto a computer to enable the computer to execute the above-described unique method of browsing the Internet. In an advantageous embodiment of the present invention, there is provided a computer program product for use in a computer system comprising: 1) a recording medium; 2) means, recorded on the recording medium, capable of enabling the computer system to access and to retrieve web page data stored on a plurality of servers in a distributed data network; 3) means, recorded on the recording medium, capable of enabling the computer system to store in a memory associated with the computer system a database of authorized web sites associated with the web page data; and 4) means, recorded on the recording medium, capable of enabling the computer system to operate in a supervisory mode in which an operator of the computer system selects the authorized web sites to be included in the database, and to operate in a user mode in which a user of the computer system may access the web page data only from the authorized web sites in the database.

In one embodiment of the present invention, the computer program product enables the system to store addresses of the authorized web sites in the database.

In another embodiment of the present invention, the computer program product enables the computer system in the user mode to compare an address of a web site selected by the user with at least one of the addresses stored in the database.

In another computer program product embodiment of the present invention, the web page data comprises at least one of text data and image data and wherein the computer system in the supervisory mode generates from the at least one of text data and image data associated with a first selected web page data first modification indicia capable of being used by the computer system to detect a modification of the at least one of text data and image data associated with the first selected web page data when the first selected web page data is subsequently accessed in the user mode.

In another computer program product embodiment of the present invention, the first modification indicia is stored in the database.

In still another embodiment of the present invention, the computer program product enables the computer system, during a subsequent access of the first selected web page data in the user mode, to generate from the at least one of text data and image data associated with the first selected web page data second modification indicia and enables the computer system to detect the modification by comparing the second modification indicia with the first modification indicia.

In one computer program product embodiment of the present invention, the first modification indicia comprises a pixel signature generated from pixel information associated with selected image data associated with the first selected web page data.

In a further computer program product embodiment of the present invention, the first modification indicia comprises a checksum value generated from selected text data associated with the first selected web page data.

In a still further embodiment of the present invention, the computer program product enables the computer system to modify at least one button function of a mouse device associated with the computer system to prevent the user from accessing web page data not associated with an authorized web site stored in the database.

In a yet further embodiment of the present invention, the computer program product enables the computer system to modify at least one button function of a keyboard device associated with the computer system to prevent the user from accessing web page data not associated with an authorized web site stored in the database.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged personal computer, mainframe computer, web server, client/server architecture, or broader computer network.

Figure 1:
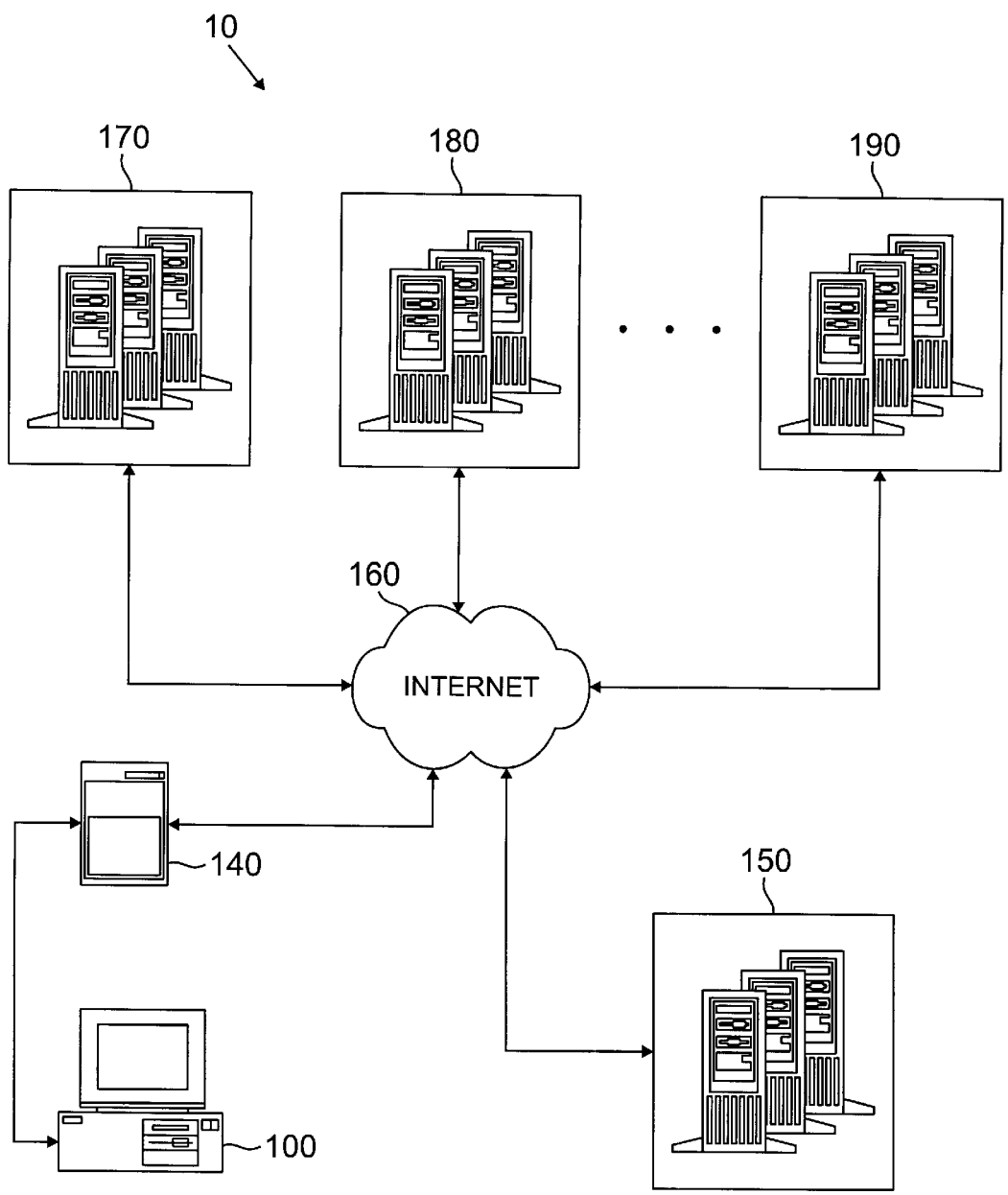
FIG. 1 illustrates an exemplary network architecture in which a browser system in accordance with the principles of the present invention may be implemented.

Referring initially to FIG. 1, there is illustrated exemplary network architecture 10 in which a browser system in accordance with the principles of the present invention may be implemented. Network architecture 10 comprises exemplary computer system 100, which may be, for example, a personal computer (PC), Internet service provider (ISP) server 140, web site authorization server 150, and wide area data communications network 160 (generally referred to hereafter as "Internet 160"). Network architecture 10 also comprises content server 170, content server 180, and content server 190.

A browser application in accordance with the principles of the present invention is installed on computer system 100. The browser application allows a user of computer system 100 to browse web sites hosted on content servers 170, 180, and 190. Each of content servers 170, 180, and 190 comprises one or more network server devices capable of interacting through Internet 160 with remote client devices, including computer system 100. Computer system 100 is coupled to Internet 160 via ISP server 140 and receives standard Internet services, such as e-mail, from ISP server 140.

One or more of the web sites hosted on each of content servers 170, 180, and 190 may contain content that is offensive to some people or is unsuitable for children, or both. As will be described below in greater detail, the browser application on computer system 100, by itself or in conjunction with web site authorization server 150, restricts access to all web sites on content servers 170, 180, and 190 except those that are specifically authorized by a parent (or supervisor) operating computer system 100. After a web site has been authorized for access, a child (or employee) may subsequently access that web site from computer system 100.

In the descriptions that follow, computer system 100 is illustrated and described in terms of an exemplary personal computer (PC) device. However, those skilled in the art will understand that the principles of the present invention are not limited to browser applications in a personal computing environment. The described embodiment of computer system 100 is by way of example only. In fact, the present invention may be implemented on or in conjunction with any suitable computer processing environment, including multi- and parallel processing environments, mainframe computers, super computers, groups of networked computers, hand-held minicomputers, such as PALMPILOT™ digital devices, and the like.

Figure 2:
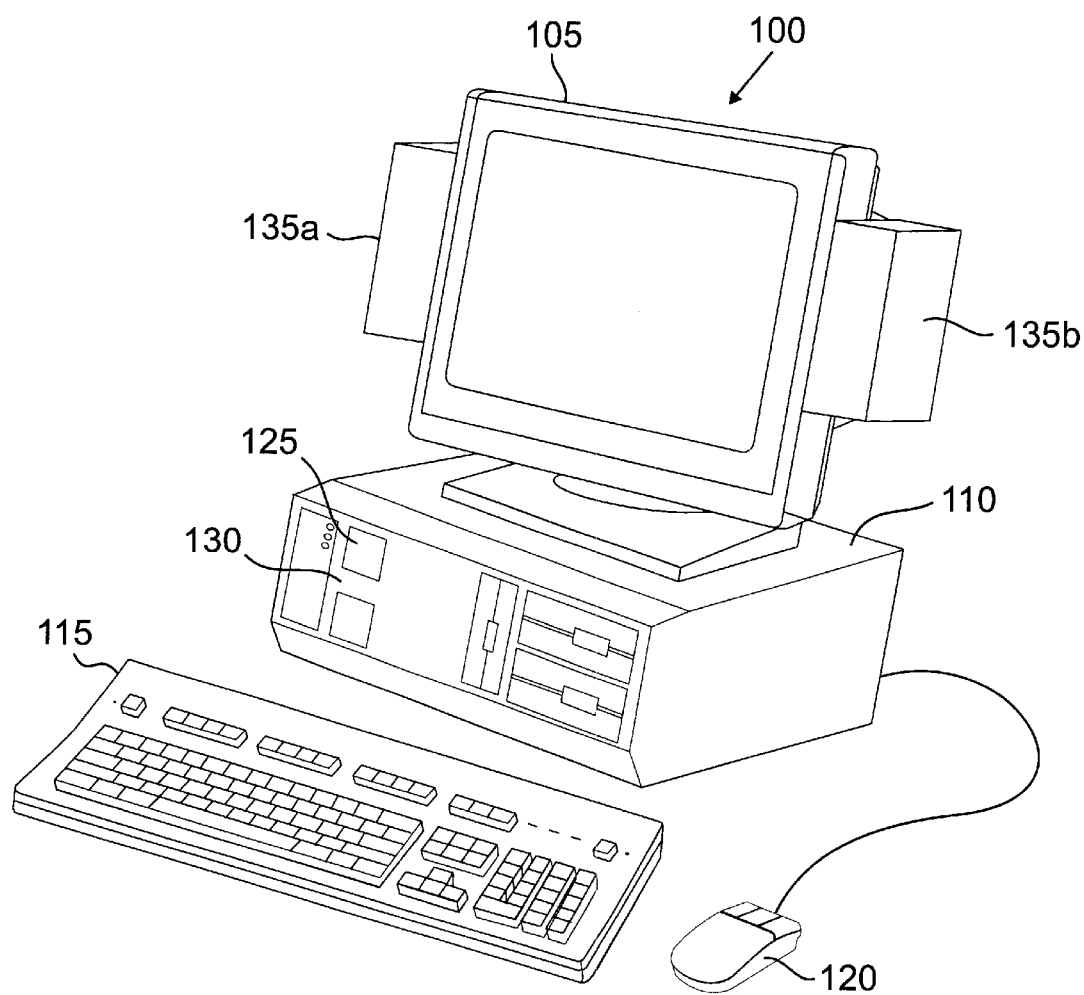
FIG. 2 illustrates the exemplary computer system in FIG. 1 in greater detail.

FIG. 2 illustrates exemplary computer system 100 in greater detail. Computer system 100 comprises display device (or monitor) 105, personal computer (PC) 110, within which are various electronic components (discussed with reference to FIG. 3), keyboard 115, mouse 120, and speakers 135a and 135b. Display device 105, keyboard 115 and mouse 120 cooperate to allow communication between computer system 100 and a user (not shown). PC 110 comprises dedicated hardware reset switch 125 and power switch 130. Reset switch 125 is adapted to trigger hardware reset circuitry (not shown) within PC 110 to reboot or restart PC 110 when the user depresses reset switch 125. Power switch 130 is capable of interrupting and restoring power to PC 110. The interruption and restoration of power brings about a restart of PC 110.

Display device 105 provides a screen area for display of graphical data under the control of an exemplary graphical user interface ("GUI") operating system (O/S) and browser application executing within PC 110. The exemplary GUI operating system manages division of computer resources among various application tasks executing in PC 110. The GUI operating system may divide the screen of display device 105 into a plurality of suitably arranged windows that display data corresponding to each of the application tasks. Each window may suitably be allowed to occupy a portion or an entirety of the screen of display device 105, depending on the user's wishes. Various ones of the windows may suitably occlude one another, whether in whole or in part.

Figure 3:
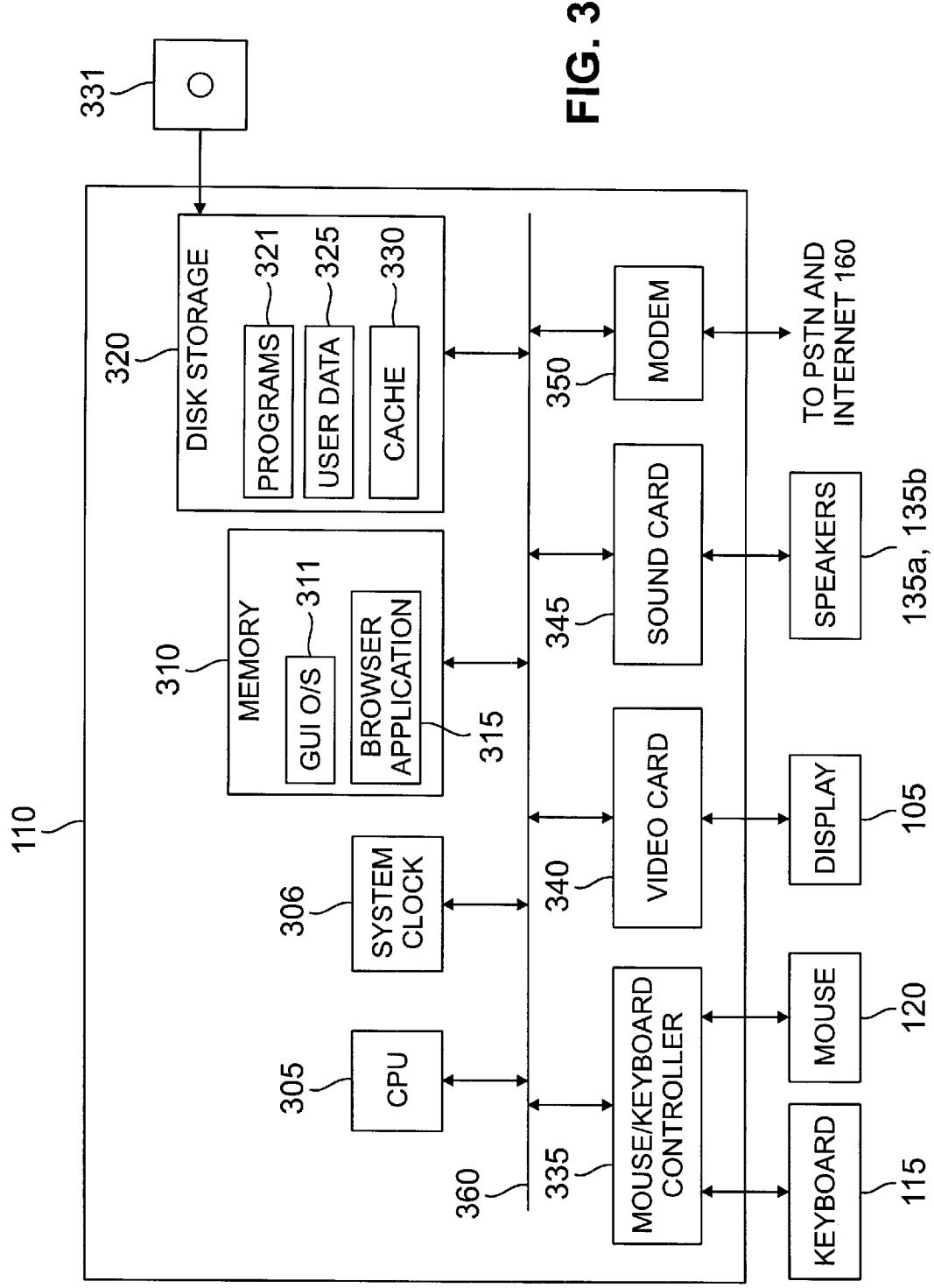
FIG. 3 illustrates in greater detail an exemplary personal computer (PC) capable of executing a browser application in accordance with the principles of the present invention.

FIG. 3 illustrates in greater detail exemplary personal computer (PC) 110 capable of executing a browser application in accordance with the principles of the present invention. PC 110 comprises central processing unit (CPU) 305, system clock 306, and memory 110, which typically comprises volatile RAM memory capable of storing browser application 315 during execution by CPU 305. According to an advantageous embodiment of the present invention, memory 310 is also used to store GUI O/S 311, which may comprise, for example, one or more of: WINDOWS® NT, WINDOWS® 95, WINDOWS® 98, UNIX®, HPUX, AIX, or similar conventional operating systems.

PC 110 also comprises disk storage device 320. Disk storage device 320 is representative of one or more readable and/or writeable fixed storage devices, such as a PC hard drive, and/or removable storage devices capable of receiving removable storage media 331, which may comprise, for example, a floppy disk, a ZIP disk, a CD-ROM disk, a DVD disk, etc. In an advantageous embodiment of the present invention, removable storage media 331 may be used to store browser application 315 and load it into computer system 100.

Disk storage device 320 contains programs 321, user data table 325, and cache 330. Programs 321 is storage space used to store applications executed by CPU 305, including copies of GUI O/S 311 and browser application 315. User data table 325 stores user IDs, user passwords, and user preference information about one or more users of computer system 100. In an advantageous embodiment of the present invention, user data table 325 stores lists of authorized URLs identifying selected web pages that have already been approved by a parent or supervisor using computer system 100. Cache 330 is used by browser application to cache data from web pages when a user of PC 110 browses the Web.

PC 110 also comprises mouse/keyboard controller 335, video care 340, sound card 345, and modem 350. The various components of PC 110 transfer data and control signals across bus 360. The user inputs data and commands to PC 110 via mouse/keyboard controller 335, which provides an interface between keyboard 115 and mouse 120 and CPU 305. Modem 350 provides a communication interface between PC 110 and the publicly switched telephone network (PSTN) and Internet 160. The GUI operating system of PC 110 transfers browser application screens and web page images to display device 105 via video card 340. Any audio files that are played by browser application 315 are transferred to speakers 135a and 135b via sound card 345.

Conventional computer system architecture is more fully discussed in THE INDISPENSABLE PC HARDWARE BOOK, by Hans-Peter Messmer, Addison Wesley (2nd ed. 1995) and COMPUTER ORGANIZATION AND ARCHITECTURE, by William Stallings, MacMillan Publishing Co. (3rd ed. 1993); conventional computer and communications network design is more fully discussed in DATA NETWORK DESIGN, by Darren L. Spohn, McGraw-Hill, Inc. (1993); conventional data communication is more fully discussed in VOICE AND DATA COMMUNICATIONS HANDBOOK, by Bud Bates and Donald Gregory, McGraw-Hill, Inc. (1996); DATA COMMUNICATIONS PRINCIPLES, by R. D. Gitlin, J. F. Hayes and S. B. Weinstein, Plenum Press (1992); and THE IRWIN HANDBOOK OF TELECOMMUNICATIONS, by James Harry Green, Irwin Professional Publishing (2nd ed. 1992). Each of the foregoing publications is incorporated herein by reference for all purposes.

Figure 4:
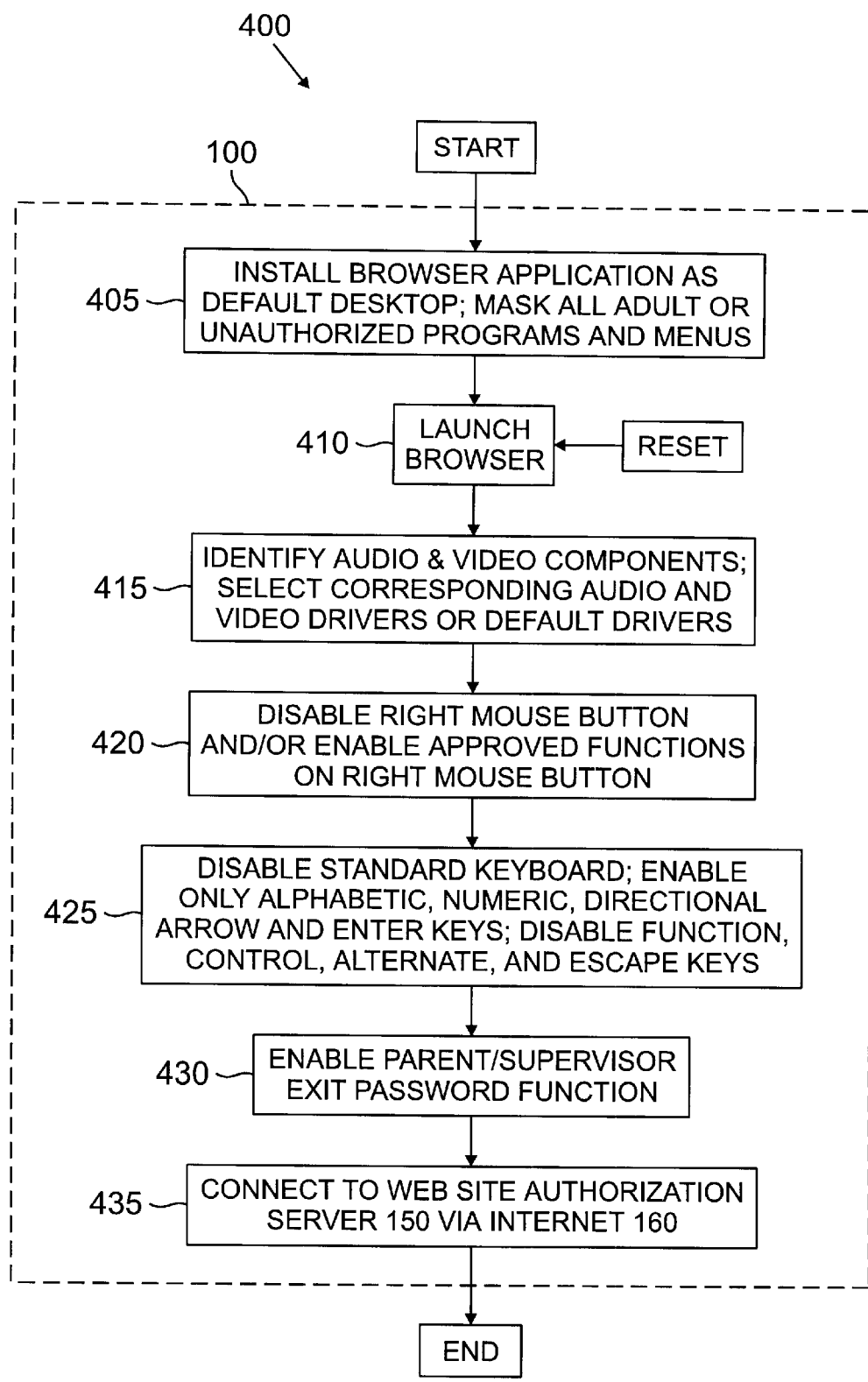
FIG. 4 illustrates a flow diagram which depicts the installation and start-up operations in the exemplary computer system of a browser application in accordance with one embodiment of the present invention.

FIG. 4 illustrates flow diagram 400, which depicts the installation and start-up operations in computer system 100 of browser application 315 in accordance with one embodiment of the present invention. Upon installation, browser application 315 replaces the existing desktop and becomes the default desktop whenever computer system 100 is restarted. All adult or unauthorized programs, icons, and menus are masked (process step 405). At this point, only browser application 315 may be launched.

After installation is complete or a reset (i.e., power is switched OFF, then ON) has occurred, browser application 315 is automatically launched (process step 410). Optionally, an icon for browser application 315 may be placed on the default desktop so that the user may select when to run browser application 315. Browser application 315 identifies the audio and video devices in computer system 100 and selects corresponding video and audio drivers, or default drivers, as the case may be (process step 415). Next, browser application 315 disables the right mouse button and/or enables approved functions only on the right mouse button (process step 420). Next, browser application 315 disable the standard keyboard buttons and enables only selected alphabetic and numeric keys, direction arrows, and the ENTER key. Browser application 315 also disables the function (F1 through F12) keys, the CONTROL key(s), the ALT key(s), and the ESCAPE key (process step 425). The reconfiguration and/or disabling of the mouse and keyboard prevent a child user or an employee user from attempting to bypass browser application 315.

If browser application 315 is being set up for the first time, browser application 315 next enables a parent or supervisor exit password function. A random password is generated for a parent or supervisor to use to exit browser application 315 and return computer system 100 to its normal configuration and standard GUI O/S 311 desktop and interface. Without the password, a child user or employee user cannot exit browser application 315 (process 430). At this point, computer system 100 will remain in browser application 315 and, if re-booted, will automatically return to browser application 315.

To finish the installation/launch operation, browser application 315 automatically connects to web site authorization server 150 via Internet 160. This is accomplished by automatically dialing up and connecting to ISP server 140 or by searching for an existing connection to ISP server 140 (process step 435).

Computer system 100 operates in one of two operating modes under control of browser application 315: parent (or supervisor) mode or child (or employee) mode. In parent mode, browser application 315 functions like a standard browser in that any web site may be accessed by browser application 315 without restriction. The parent (supervisor) selects acceptable web sites and adds them to a database of authorized web sites that the child (employee) may visit. Later, during child mode, browser application 315 permits the child (employee) to access only those web sites that appear in the database of authorized web sites. Before explaining the operation of parent mode and child mode in greater detail, the database of authorized web sites generated by browser application 315 under control of the parent (employer) will be discussed.

Figure 5:
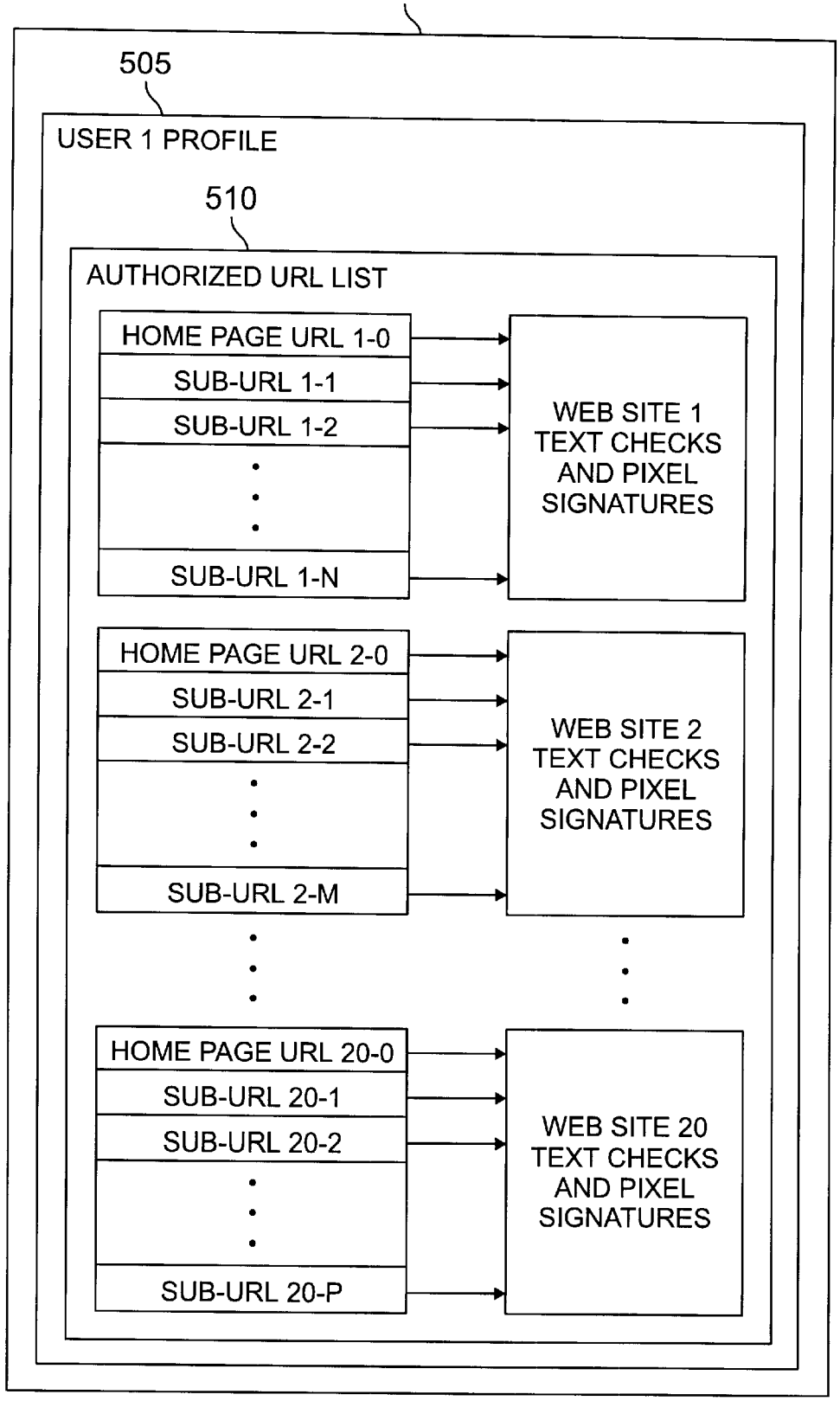
FIG. 5 illustrates an exemplary user data table in the disk storage of the exemplary computer system according to one embodiment of the present invention.

FIG. 5 illustrates exemplary user data table 325 according to one embodiment of the present invention. User data table 325 contains a user profile table for each user of computer system 100, including exemplary user profile table 505 (hereafter referred to as "User 1 Profile"). User 1 Profile comprises, among other things, authorized URL list 510, which contains correlated lists of web pages that have been approved by a parent (or employer) for viewing by a child (or employee). In the illustrated example, web pages from twenty (20) web sites have been approved and are stored in authorized URL list 510.

A plurality of web pages from an exemplary web site, referred to as Web Site 1, are stored in authorized URL list 510. The primary web page (or home page) of Web Site 1 is stored in memory as Home Page URL 1-0. Subsequent web pages associated with Web Site 1 are stored as Sub-URL 1-1, Sub-URL 1-2, ... Sub-URL 1-m. Each authorized web page has associated therewith one or more modification indicators (or data verification values) stored in an array labeled "Web Site 1 Text Checks and Pixel Signatures." When a web page is first approved and downloaded by a parent (supervisor), browser application 315 generates a unique identifier for each graphic image (i.e., JPEG file, GIF file, Bitmap file, etc.), text file, or other element in the web page. The unique identifiers serve as modification indicators in that browser application 315 uses them to determine if graphics or text in subsequently downloaded web pages have been modified.

The unique identifiers for graphic images are called "pixel signatures" and are generated by applying a unique algorithm to a few randomly selected pixels in the graphic image file. If the value of a pixel signature is different when a web page is subsequently downloaded by a child, browser application 315 may occlude the graphic image or refuse to display the web page at all. Similarly, browser application 315 generates unique identifiers for text data, background (or wall paper) patterns, and other elements that form the web page in order to detect changes that occur subsequent to approval of the web page.

In the case of a child, browser application 315 does not allow any modified element of a web page to be displayed to the child until after a parent has re-approved the web page.

In this manner, a parent has complete control over the web sites that a child may access. The child cannot browse any web pages that a parent has not approved and subsequent changes to an approved web page are rejected or occluded by browser application 315 until after the change has been re-approved by the parent. When the parent approves of the changes, the web pages in authorized URL list 510 are correspondingly updated. This prevents a child from viewing inappropriate material on a web site, whether the offensive matter is added by the web site owner or is maliciously inserted by an outsider.

In the case of an employee, it is not as important to prevent the employee from seeing offensive material as it is in the case of a child. Relatively speaking, it is more important to prevent an employee from browsing non-work related web sites, whether or not offensive. Browser application 315 gives a supervisor the option of allowing access only to individual web pages at a selected web site or to the entire web site en masse once the supervisor has determined that the web site is work related. Similarly, browser application 315 may occlude any subsequently changed elements of a web page at a supervisor's option, although this is relatively less important than it is in the case of a child.

In an advantageous embodiment of the present invention, browser application 315 is installed with an initial pre-approved list of child-appropriate URLs in authorized URL list 510. Alternatively, the initial pre-approved list of child-appropriate URLs may be downloaded from web site authorization server 150. This enables a parent to avoid starting from scratch in building a database of safe URLs for a child. The parent still has the option of deleting the initial pre-approved URLS, if so desired. Furthermore, browser application 315 periodically "pings" web site authorization server 150, which may respond by transferring to browser application 315 software correction updates, additional child-appropriate URLs, etc.

While the user data table 325 was illustrated resident to disk storage device 320 in FIG. 3, those skilled in the computer arts will understand that the same may be maintained remotely in alternate embodiments, such as at the website authorization server 150. In yet further embodiments, the data table may be distributed across multiple storage devices or computer systems.

Figure 6:
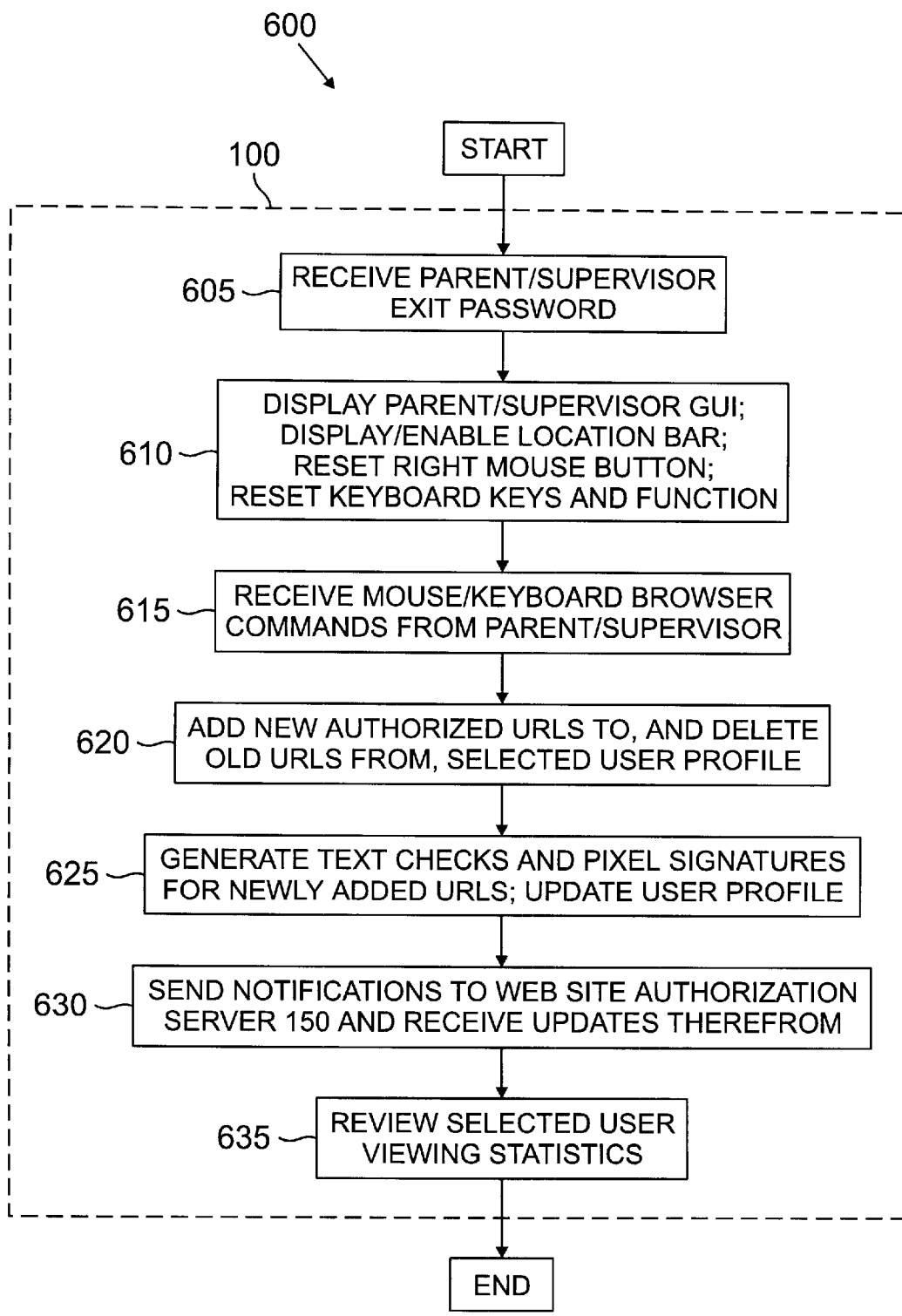
FIG. 6 illustrates a flow diagram, which depicts the parent (supervisor) operating mode of the exemplary browser application in accordance with one embodiment of the present invention.

FIG. 6 illustrates flow diagram 600, which depicts the parent (supervisor) operating mode of browser application 315 in accordance with one embodiment of the present invention. Initially, browser application 315 is in child operating mode, described below in greater detail in connection with FIG. 7, when a parent (or supervisor) enters the parent (supervisor) exit password (process step 605). In response, browser application 315 modifies the limited GUI display used by the child (employee) to a more complete parent (supervisor) GUI display. In an advantageous embodiment, browser application 315 inserts or re-enables a location bar on the GUI display so that the parent may type a target URL location into the location bar. Browser application 315 also resets the right mouse button and the keyboard to standard configurations that enable the parent to perform functions and access web sites that are forbidden to a child user (process step 610). At this point, the parent or supervisor optionally may quit (or exit) browser application 315 and return computer system 100 to its standard graphical user interface and software application configuration.

Next, browser application 315 receives mouse and/or keyboard commands and data as the parent (or supervisor) begins to browse the Web (process step 615). From time to time, browser application 315 adds new authorized URLs to a selected user profile in response to point-and-click commands received from the parent GUI display. Similarly, browser application 315 may also delete existing authorized URLs from a selected user profile in response to point-and-click commands received from the parent GUI display (process step 620). As new URLs are added and old URLs are deleted by the parent (supervisor), browser application 315 generates selected text checksums and pixel signatures for the text and graphic elements that make up each authorized web page (process step 625).

In an advantageous embodiment of the present invention, the parent may send e-mail notifications to web site authorization server 150 and receive updates from it (process step 630). The notifications sent by the parent may include suggestions regarding new child-appropriate web sites that the parent has found and which may be added to the database maintained by web site authorization server 150. The notifications sent to web site authorization server 150 also may include warnings regarding web sites that have been changed to contain offensive material or web sites that have been closed down. The updates received from web site authorization server 150 may include correction "patches" to repair errors in browser application 315. The update also may include lists of new URLs that are appropriate for children.

Finally, the parent may review selected user viewing statistics gathered by browser application 315 (process step 635). In an advantageous embodiment of the present invention, browser application 315 may use system clock 306 to record the amount of time that a child spends reviewing selected URL pages. The parent may optionally send these viewing statistics to web site authorization server 150.

Figure 7:
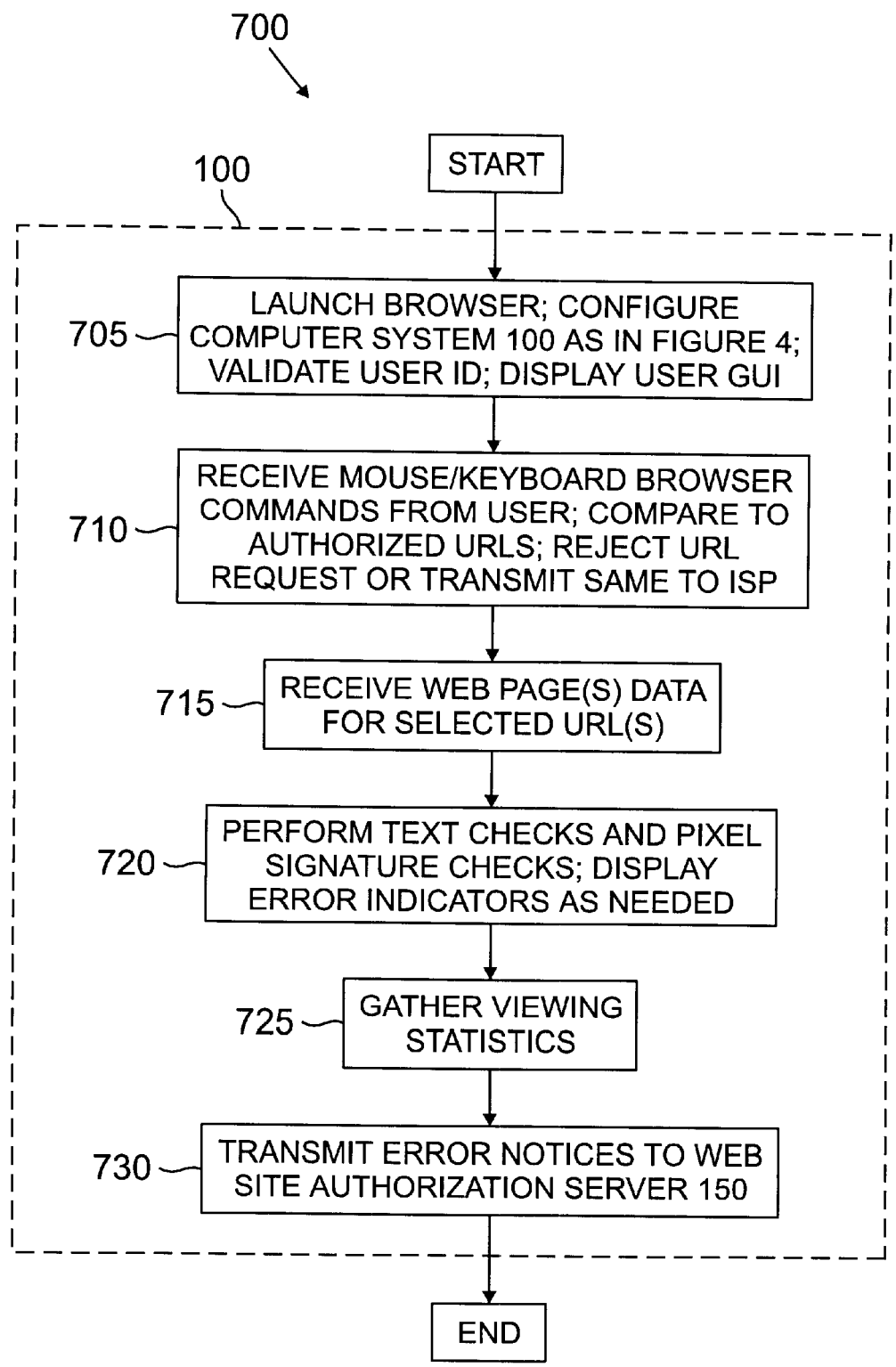
FIG. 7 illustrates a flow diagram, which depicts the child (employee) operating mode of the exemplary browser application in accordance with one embodiment of the present invention.

FIG. 7 illustrates flow diagram 700, which depicts the child (employee) operating mode of browser application 315 in accordance with one embodiment of the present invention. Initially, browser application 315 is launched by starting or re-booting computer system 100. Browser application 315 configures computer system 100, as described above in connection with FIG. 4. Optionally, browser application 315 may prompt the child or employee to enter a user name and user ID in order to verify his or her identity and to select a corresponding user profile from user data table 325. After verification, browser application 315 displays a graphical user interface corresponding to the user.

Alternatively, browser application 315 may omit the identity verification step and simply display a standard child (employee) graphical user interface (process step 705).

When the initial set-up routine is complete, browser application 315 receives browser commands from the user in the form of mouse and keyboard inputs. The user initially clicks on screen icons designating broad categories groups and is led to subsequent screen menus and icons identifying increasingly narrow topics. When a suitably narrow topic area has been selected, icons linking directly to selected pre-authorized URLs are displayed on the screen. Alternatively, the user may be allowed to type a specific URL into a screen window. The URL selected by the child (employee) is then compared to the most recently updated list of authorized web sites on in authorized URL list 510. If the URL that is "clicked" or typed in by the user is not in, or is no longer in, authorized URL list 510, browser application 315 rejects the request and displays an error indication on the screen. However, if the URL selected by the user is in authorized URL list 510, browser application 315 sends the request to ISP server 140 (process step 710).

ISP server 140 then retrieves the selected web page from one or more of content servers 170, 180 or 190 and forwards the web page to browser application 315 (process step 715). Next, browser application 315 verifies that the text and/or graphic images contained in the received web page have not been modified since the web page was last approved by the parent (supervisor). This is done by generating check sums and pixel signatures for the received text and graphic images and comparing the results with the corresponding check sums and pixel signatures stored in authorized URL list 510. If a mismatch occurs, browser application 315 does not display the text and/or graphic image. Instead, browser application 315 substitutes an "error" indication, such as a paint-ball splotch, a stop sign, a blackened box, or the like, and records the error in user data table 325. Subsequently, a parent (supervisor) may view the web page on which the mismatch occurred and, if the changed test or image is inoffensive, re-authorize the newly updated web page (process step 720).

In the background, browser application 315 may gather viewing statistics on the child or employee. For example, browser application 315 may use system clock 306 to record the amount of time the child (employee) spends on each web site and each web page. Browser application 315 also may use system clock 306 to record the amount of time between mouse clicks and/or key strokes, thereby measuring the amount of idle time when the child (employee) is not operating browser application 315 (process step 725). In an advantageous embodiment of the present invention, browser application 315 may transmit to web site authorization server 150 information about changed graphics or text on authorized web pages or about web sites that are no longer valid (process step 730). This enables the operator of web site authorization server 150 to augment and to improve the database of child appropriate web sites stored in web site authorization server 150.

In the above-described embodiments of the present invention, most of the functions performed by browser application 315 are executed in computer system 100. While these embodiments may have certain speed and/or security advantages, this is by no means a necessary condition for implementing the present invention. In alternate embodiments, some or even all of the functions performed by browser application 315 may be distributed among other processing nodes in exemplary network architecture 10, as was discussed with reference to FIG. 5, for instance. In particular, many of the functions performed by browser application 315 may be executed in web site authorization server 150. Additionally, the authorized web-site database and user profile information used by browser application 315 may be stored in web site authorization server 150. In such a configuration, computer system 100 essentially acts as a dummy terminal controlled by browser application 315 in web site authorization server 150.

Although the present invention has been described in detail, those skilled in the art should understand that they can make various changes, substitutions and alterations herein without departing from the spirit and scope of the invention in its broadest form.

What is claimed is:

1. A browser apparatus for accessing web pages stored on a plurality of servers in a distributed data network, said browser apparatus comprising:
    a memory capable of storing an access authorization database, said access authorization database comprising a plurality of authorized web sites associated with said web pages, wherein each of said plurality of authorized web sites has associated therewith at least one approved content verification value stored in said access authorization database and generated from at least one web page in said each of said plurality of authorized web sites; and
    a data processor capable of retrieving said web pages from said plurality of servers, wherein said data processor operates in a supervisory mode in which an operator of said browser apparatus selects said plurality of authorized web sites to be included in said access authorization database and generates said at least one approved content verification value for each of said plurality of authorized web sites and wherein said data processor operates in a user mode in which a user of said browser apparatus requests a first requested web page, said data processor permitting said user to access said first requested web page only if said first requested web page is associated with a first one of said plurality of authorized web sites and only if a second content verification value generated from a retrieved copy of said first requested web page matches an approved content verification value associated with said first requested web page and stored in said access authorization database.

2. The browser apparatus as set forth in claim 1 wherein said access authorization database stores Internet addresses of said plurality of authorized web sites.

3. The browser apparatus as set forth in claim 2 wherein said data processor in said user mode compares an address of said first requested web page requested by said user with at least one address associated with said first one of said plurality of authorized web sites stored in said access authorization database.

4. The browser apparatus as set forth in claim 1 wherein said data processor in said supervisory mode generates said at least one approved content verification value from text data associated with said at least one web page.

5. The browser apparatus as set forth in claim 4 wherein said at least one approved content verification value comprises a text check sum value generated from said text data.

6. The browser apparatus as set forth in claim 1 wherein said data processor in said supervisory mode generates said at least one approved content verification value from image data associated with said at least one web page.

7. The browser apparatus as set forth in claim 6 wherein said at least one approved content verification value comprises a pixel signature generated from pixel information associated with said image data.

8. For use in a distributed data network comprising a plurality of servers capable of storing web pages in a plurality of web sites on the plurality of servers, a method of browsing the web pages comprising the steps of:
    in a supervisory mode:
        storing in an access authorization database a plurality of authorized web sites associated with the web pages;
        generating at least one approved content verification value from at least one web page in each of the plurality of authorized web sites stored in the access authorization database; and
        storing the at least one approved content verification value in the access authorization database; and
    in a user mode:
        receiving from a user a request for access to a first requested web page;
        retrieving a copy of the first requested web page from a first of the plurality of servers;

generating a second content verification value from the retrieved copy of the first requested web page; and permitting the user to access the first requested web page only if the first requested web page is associated with a first one of the plurality of authorized web sites and only if a second content verification value generated from the retrieved copy of the first requested web page matches an approved content verification value associated with the first requested web page and stored in the access authorization database.

9. The method as set forth in claim 8 wherein the step of storing the plurality of authorized web sites comprises the sub-step of storing Internet addresses of the plurality of authorized web sites in the access authorization database.

10. The method as set forth in claim 9 further comprising, in the user mode, the step of comparing an address of the first requested web page requested by the user with at least one address associated with the first one of the plurality of authorized web sites stored in the access authorization database.

11. The method as set forth in claim 8 further comprising, in the supervisory mode, the sub-step of generating the at least one approved content verification value from text data associated with the at least one web page.

12. The method as set forth in claim 11 wherein the at least one approved content verification value comprises a text check sum value generated from the text data.

13. The method as set forth in claim 8 further comprising, in the supervisory mode, the sub-step of generating the at least one approved content verification value from image data associated with the at least one web page.

14. The method as set forth in claim 13 wherein the at least one approved content verification value comprises a pixel signature generated from pixel information associated with the image data.

15. For use in a computer system, computer-executable instructions stored on a computer-readable storage medium capable of enabling the computer system to browse web pages in a distributed data network comprising a plurality of servers capable of storing web pages in a plurality of web sites on the plurality of servers, the computer-executable instructions comprising the steps of:

in a supervisory mode:
storing in an access authorization database associated with the computer system a plurality of authorized web sites associated with the web pages;
generating at least one approved content verification value from at least one web page in each of the plurality of authorized web sites stored in the access authorization database; and
storing the at least one approved content verification value in the access authorization database; and in a user mode:
receiving from a user of the computer system a request for access to a first requested web page;
retrieving a copy of the first requested web page from a first of the plurality of servers;
generating a second content verification value from the retrieved copy of the first requested web page; and
permitting the user to access the first requested web page only if the first requested web page is associated with a first one of the plurality of authorized web sites and only if a second content verification value generated from the retrieved copy of the first requested web page matches an approved content verification value associated with the first requested web page and stored in the access authorization database.

16. The computer-executable instructions stored on a computer-readable storage medium as set forth in claim 15 wherein the computer-executable instructions further comprise the step of storing the plurality of authorized web sites comprises the sub-step of storing Internet addresses of the plurality of authorized web sites in the access authorization database.

17. The computer-executable instructions stored on a computer-readable storage medium as set forth in claim 16 wherein the computer-executable instructions further comprise, in the user mode, the step of comparing an address of the first requested web page requested by the user with at least one address associated with the first one of the plurality of authorized web sites stored in the access authorization database.

18. The computer-executable instructions stored on a computer-readable storage medium as set forth in claim 15 wherein the computer-executable instructions further comprise, in the supervisory mode, the sub-step of generating the at least one approved content verification value from text data associated with the at least one web page.

19. The computer-executable instructions stored on a computer-readable storage medium as set forth in claim 18 wherein the at least one approved content verification value comprises a text check sum value generated from the text data.

20. The computer-executable instructions stored on a computer-readable storage medium as set forth in claim 15 wherein the computer-executable instructions further comprise, in the supervisory mode, the sub-step of generating the at least one approved content verification value from image data associated with the at least one web page.

21. The computer-executable instructions stored on a computer-readable storage medium as set forth in claim 20 wherein the at least one approved content verification value comprises a pixel signature generated from pixel information associated with the image data.

* * * * *